United States Patent
Boulton

(10) Patent No.: US 12,547,728 B2
(45) Date of Patent: Feb. 10, 2026

(54) DETERMINING SECURITY RISKS IN BINARY SOFTWARE CODE USING A SOFTWARE RELATIONSHIP MODEL

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 274 days.

(21) Appl. No.: 17/695,473

(22) Filed: Mar. 15, 2022

(65) Prior Publication Data

US 2023/0297688 A1  Sep. 21, 2023

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .......... G06F 21/12; G06F 21/50; G06F 21/57; G06F 21/577; G06F 2221/033; G06F 21/16; G06F 21/6245; G06F 21/56; G06F 11/362; G06F 21/563; G06F 21/53
See application file for complete search history.

(56) References Cited

U.S. PATENT DOCUMENTS

| | | | | |
|---|---|---|---|---|
| 9,749,349 B1 * | 8/2017 | Czarny | ............... | H04L 63/1425 |
| 10,607,015 B1 * | 3/2020 | Hecht | ........................ | G06F 9/54 |
| 10,984,102 B2 * | 4/2021 | Boulton | .................... | G06F 8/75 |
| 11,113,405 B2 * | 9/2021 | Hodgman | ............. | G06F 21/577 |
| 11,709,943 B2 * | 7/2023 | Tokarz | ............. | G06Q 10/06313 |
| | | | | 726/25 |
| 2012/0222122 A1 * | 8/2012 | Das | ........................ | G06F 21/577 |
| | | | | 726/25 |
| 2013/0160130 A1 * | 6/2013 | Mendelev | ............... | G06F 21/56 |
| | | | | 726/25 |
| 2016/0188884 A1 | 6/2016 | Ayoub et al. | | |
| 2020/0082080 A1 * | 3/2020 | Boulton | ................ | G06F 21/565 |
| 2020/0104492 A1 * | 4/2020 | Boulton | .................... | G06F 8/77 |
| 2020/0311281 A1 * | 10/2020 | Boulton | ................ | G06F 21/552 |
| 2022/0405397 A1 * | 12/2022 | Golan | ..................... | G06F 21/57 |
| 2023/0177164 A1 * | 6/2023 | Tamboli | ................ | G06F 11/362 |
| | | | | 726/26 |

OTHER PUBLICATIONS

Toolbox.com [online], "Top 10 Threat Modeling Tools in 2021" Dec. 7, 2021, [retrieved on May 4, 2022], retrieved from : URL <https://www.toolbox.com/it-security/vulnerability-management/articles/top-10-threat-modeling-tools-2021/>, 30 pages.

* cited by examiner

*Primary Examiner* — Daniel B Potratz
(74) *Attorney, Agent, or Firm* — Fish & Richardson P.C.

(57) ABSTRACT

Systems, methods, and software can be used to determine security risks in binary software using a software relationship model. In some aspects, a method comprises: receiving a software relationship model that identifies: (i) a set of software components, and (ii) communication interfaces between software components in the set of software components; receiving a set of binary software code; generating a risk assessment for the set of binary software code based on the software relationship model; and generating a notification, based on the risk assessment for the set of binary software code, that indicates security risks associated with the set of binary software code.

15 Claims, 4 Drawing Sheets

DETERMINING SECURITY RISKS IN BINARY SOFTWARE CODE USING A SOFTWARE RELATIONSHIP MODEL

TECHNICAL FIELD

The present disclosure relates to determining security risks in binary software code using a software relationship model.

BACKGROUND

In some cases, software services can be provided by executable binary software code. The binary software code is computer software in a binary format. The computer software can be application software, system software (e.g., an operating system or a device driver), or a component thereof. The binary software code can also be referred to as binary program code, executable code, or object code.

DESCRIPTION OF DRAWINGS

Like reference numbers and designations in the various drawings indicate like elements.

DETAILED DESCRIPTION

Figure 1:
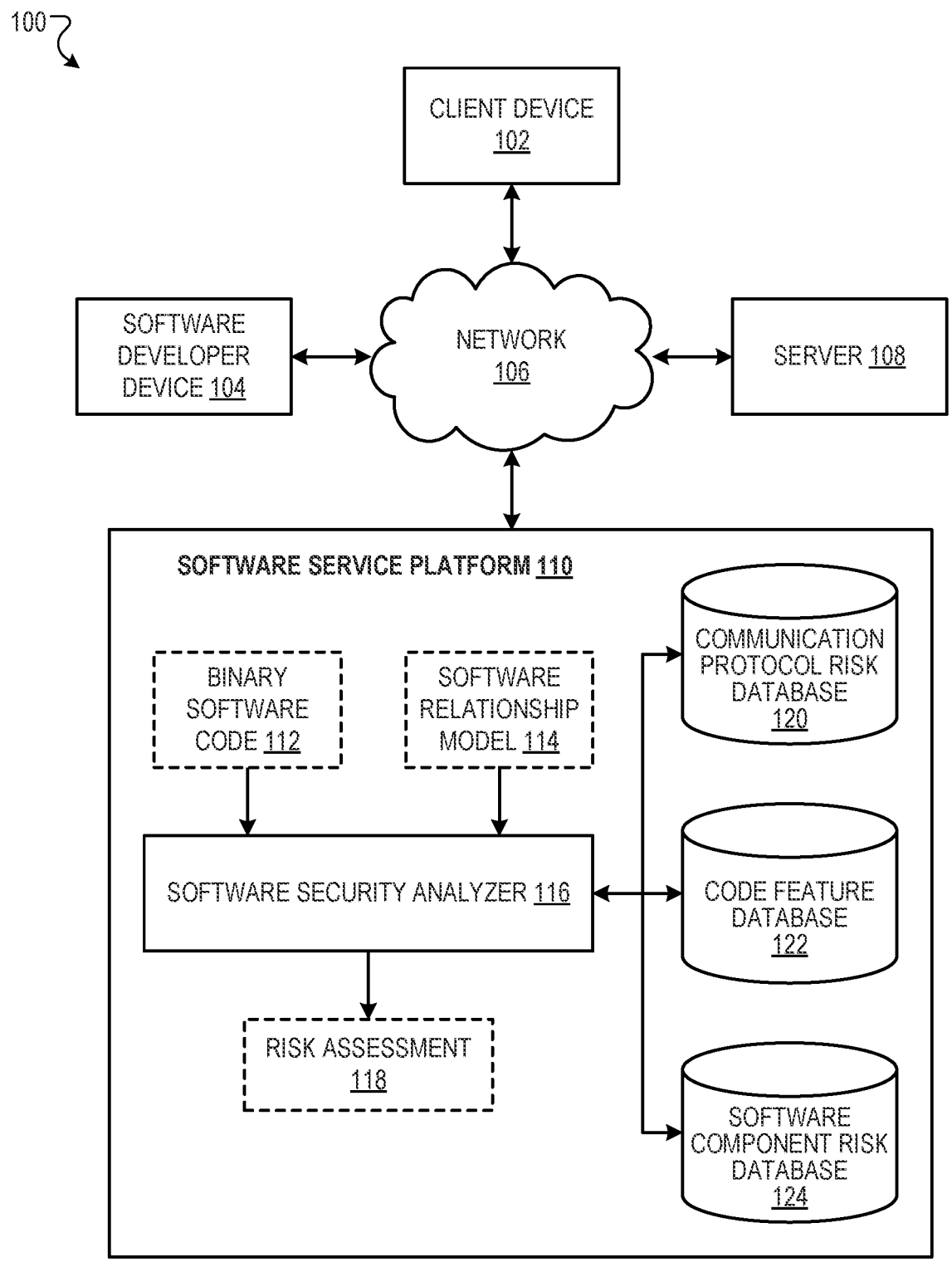
FIG. 1 is a schematic diagram showing an example communication system that determines security risks of binary software code using a software relationship model.

A software developer can submit software code to a software service platform that is operated by a software provider. The software code can be executed on the software service platform to provide software services to client devices. Alternatively or additionally, the software code can be downloaded to client devices. The software service platform can be implemented on one or more servers, or on a cloud-computing platform.

The software service platform can process the software code to determine security risks of the software code. Security risks can include malicious software code that would harm client devices, expose user information, or a combination thereof. Security risks can also include code that is vulnerable to malicious attacks.

However, the software code can be, e.g., binary software code that is submitted without the source code, and therefore it may be difficult to inspect the binary software code to identify the security risks. Binary software code can include a stream of bytes that are generated by compiling the source code of the software. Thus, the binary software code cannot be easily parsed or analyzed.

The software service platform can determine security risks of the software code using a software relationship model.

A software relationship model defines an architecture of a software system (i.e., a collection of software). More specifically, a software relationship model identifies: (i) a set of software components of the software system, and (ii) communication interfaces between software components of the software system.

A software component can represent a discrete unit of software in the software system, e.g., that performs particular operations or tasks in the software system, and that can be implemented by a set of software code, e.g., binary software code. The set of software components in the software relationship model can include any appropriate number of software components, e.g., 10, 100, or 1000 software components.

A communication interface exists between a pair of software components if the pair of software components are configured with communicate with one another. A first software component can be said to "communicate" with a second software component if, during operation of the software components (e.g., during execution of software code implementing the software components), the first software component transmits data to or receives data from the second software component.

A pair of software components can communicate over any appropriate communication channel, e.g., a wired communication channel, a wireless communication channel, or a combination of both. Communication between a pair of software components over a communication channel can be performed in accordance with an appropriate communication protocol, e.g., a Hypertext Transfer Protocol Secure (HTTPS) Protocol, File Transfer Protocol (FTP), a Secure Shell (SSH) Protocol, or a Wireless Fidelity (Wi-Fi) Protocol. In some cases, a communication protocol can include one or more security measures, e.g., security measures specifying that data communicated in an accordance with the communication protocol be encrypted or otherwise protected. In addition to identifying the software components and the communication interfaces of the software system, the software relationship model can further identify a respective communication protocol for each of one or more of the communication interfaces of the software system.

To generate a risk assessment for a set of binary software code, the software service platform can identify a software component from the software relationship model that corresponds to the binary software code. (A set of binary software code can be said to "correspond" to a software component if the binary software code implements the software component, i.e., such that the binary software code, when executed, performs the operations of the software component). That is, the software service platform can map the set of binary software code onto a corresponding software component from the software relationship model.

For convenience, throughout this specification, the set of binary software code (i.e., for which the software service platform generates the risk assessment) may be referred to as the "target" binary software code, and software component corresponding to the target binary software code may be referred to as the "target" software component.

The software security platform can use the software relationship model to identify one or more communication interfaces associated with the target software component. The software security platform can then determine the risk assessment for the target binary software code based on the communication interfaces associated with the target software component.

For example, the software security platform can identify possible security risks based on the communication protocols of the communication interfaces associated with the target software component, and then scan the target binary software code to evaluate the possible security risks.

As another example, the software security platform can identify security risks resulting from, e.g., quality or craftsmanship issues with the target binary software code, by performing a statistical analysis of the target binary software code based on the communication protocols of the communication interfaces of the target software component. In particular, the software security platform can compare statistical features of: (i) the target binary software code, and (ii) other binary software code associated with communication interfaces sharing one or more of the same communication protocols, and determine the risk assessment based in part on the results of the comparison. In this example, large deviations in the expected statistical features of the target binary software code, when compared with other binary software code associated with communication interfaces sharing one or more of the same communication protocols, can suggest a possible security risk.

As another example, the software security platform can generate the risk assessment for the target binary software code based at least in part on security risks identified for binary software code corresponding to "neighboring" software components. A neighboring software component can refer to a software component that shares a communication interface with the target software component. Thus the software security platform can generate risk assessments reflecting that security risks can propagate along "paths to exploitability," e.g., sequences of software components, connected by communication interfaces, that share related security risks.

These and other implementations of the software security platform are described in more detail below with reference to FIG. 1-3.

Techniques described herein produce one or more technical effects. The software service platform can, by using software relationship model, generate risk assessments for sets of binary software code that are more comprehensive and accurate, e.g., than risk assessments generated without the use of software relationship models. For example, the software service platform can generate risk assessments that reflect propagation of security risks along paths to exploitability using the software relationship model. The software service platform can thus facilitate improved operation of computer systems, e.g., by generating comprehensive and accurate risk assessments that enable security risks to be identified and mitigated before they result in computer systems being compromised or malfunctioning. In particular, the software security platform enables more efficient use of computational resources, e.g., memory and computing power, by reducing the likelihood of these resources being underutilized in the event of a computer system being compromised or malfunctioning as a result of security risks in software code.

FIG. 1 is a schematic diagram showing an example communication system 100 that determines security risks of binary software code using a software relationship model. The example communication system 100 includes a client device 102, a software developer device 104, a server 108, and a software service platform 110 that are communicatively coupled with a network 106.

The software developer device 104 represents an application, a set of applications, software, software modules, hardware, or any combination thereof, that can be configured to submit a set of binary software code and a software relationship model to the software service platform 110. The set of binary software code can be downloaded to the client device 102 to be executed on the client device 102. The set of binary software code can also be executed on the software service platform 110 to provide software service to the client device 102. Examples of the software services can include software as a service (SaaS) applications such as SALESFORCE, OFFICE 365, or other software application services.

The software service platform 110 includes a software security analyzer 116, a communication protocol risk database 120, a code feature database 122, and a software component risk database 124.

The software security analyzer 116 represents an application, a set of applications, software, software modules, hardware, or any combination thereof, that can be configured to process: (i) a set of binary software code 112, and (ii) a software relationship model 114, to generate a risk assessment 118. The risk assessment 118 identifies security risks in the binary software code 112. The software security analyzer 116 can generate the risk assessment, e.g., by identifying a software component in the software relationship model 114 that corresponds to the set of binary software code 112, and determining the risk assessment based on the communication interfaces associated with the software component. Example techniques for generating a risk assessment 118 for a set of binary software code 112 using a software relationship model 114 are described in more detail below with reference to FIG. 3.

The communication protocol risk database 120 represents an application, a set of applications, software, software modules, hardware, or any combination thereof that can be configured to store data that defines, for each communication protocol in a set of communication protocols, a set of one or more possible security risks corresponding to the communication protocol. In operation, the software security analyzer 116 can query the communication protocol risk database 120 to identify possible security risks for a software component based on the communication protocols implemented by the communication interfaces of the software component. Example techniques for generating a risk assessment for a set of binary software code using the communication protocol risk database 120 are described in more detail with reference to FIG. 3.

The code feature database 122 represents an application, a set of applications, software, software modules, hardware, or any combination thereof that can be configured to store data that defines, for each communication protocol, statistical features of other binary software code associated with communication interfaces that implement the communication protocol. In operation, the software security analyzer 116 can query the code feature database 122 to determine statistical features of historical binary software code associated with the same communication protocols as a software component. The software security analyzer 116 can then compare statistical features of the binary software code implementing the software component to the statistical features of the historical binary software code, and identify one or more security risks based on the comparison. Example techniques for generating a risk assessment for a set of binary software code using the code feature database 122 are described in more detail with reference to FIG. 3.

The software component risk database 124 represents an application, a set of applications, software, software modules, hardware, or any combination thereof that can be configured to store data that defines, for each of one or more software components of the software relationship model, a set of one or more security risks that have been previously identified (e.g., by the software security analyzer 116) for binary software code implementing the software component. In operation, to identify security risks for binary software code implementing a target software component, the software security analyzer 116 can query the software component risk database 124 to determine security risks that have been identified for "neighboring" software components. (A "neighboring" software component can refer to a software component that shares a communication interface with the target software component). The software security analyzer 116 can then identify security risks of the set of binary software code implementing the target software component based on security risks corresponding to the neighboring software components. Example techniques for generating a risk assessment for a set of binary software code using the software component risk database 124 are described in more detail with reference to FIG. 3.

The software security analyzer 116 can use one or more of: the communication protocol risk database 120, the code feature database 122, or the software component risk database 124, to generate the risk assessment 118, as will be described in more detail with reference to FIG. 3.

In some cases, as illustrated, the communication protocol risk database 120, the code feature database 122, and the software component risk database 124 can be implemented on the same platform as the software security analyzer 116. Alternatively or additionally, the communication protocol risk database 120, the code feature database 122, and the software component risk database 124 can be implemented on a different hardware platform that is accessible to the software security analyzer 116.

The software service platform 110 can be implemented using one or more computers, computer servers, or a cloud-computing platform.

The server 108 represents an application, a set of applications, software, software modules, hardware, or any combination thereof, that can be accessed by the set of binary software code when executed. The server 108 can be an application server, a service provider, or any other network entity, e.g., that can be accessed at one or more network addresses included in the set of binary software code 112. The server 108 can be implemented using one or more computers, computer servers, or a cloud-computing platform.

The client device 102 represents a device that can use the set of binary software code 112. In some cases, the set of binary software code can be installed on the client device 102, e.g., by downloading over the network 106 or copying locally onto the client device 102. Alternatively, the client device 102 can access a software service provided by the set of binary software code 112. In one example, a browser or a client application can be executed on the client device 102 to communicate service requests and service responses with the software service platform 110 to obtain software services.

Turning to a general description, the client device 102 may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

The example communication system 100 includes the network 106. The network 106 represents an application, set of applications, software, software modules, hardware, or a combination thereof that can be configured to transmit data messages between the entities in the system. The network 106 can include a wireless network, a wireline network, the Internet, or a combination thereof. For example, the network 106 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

Figure 2:
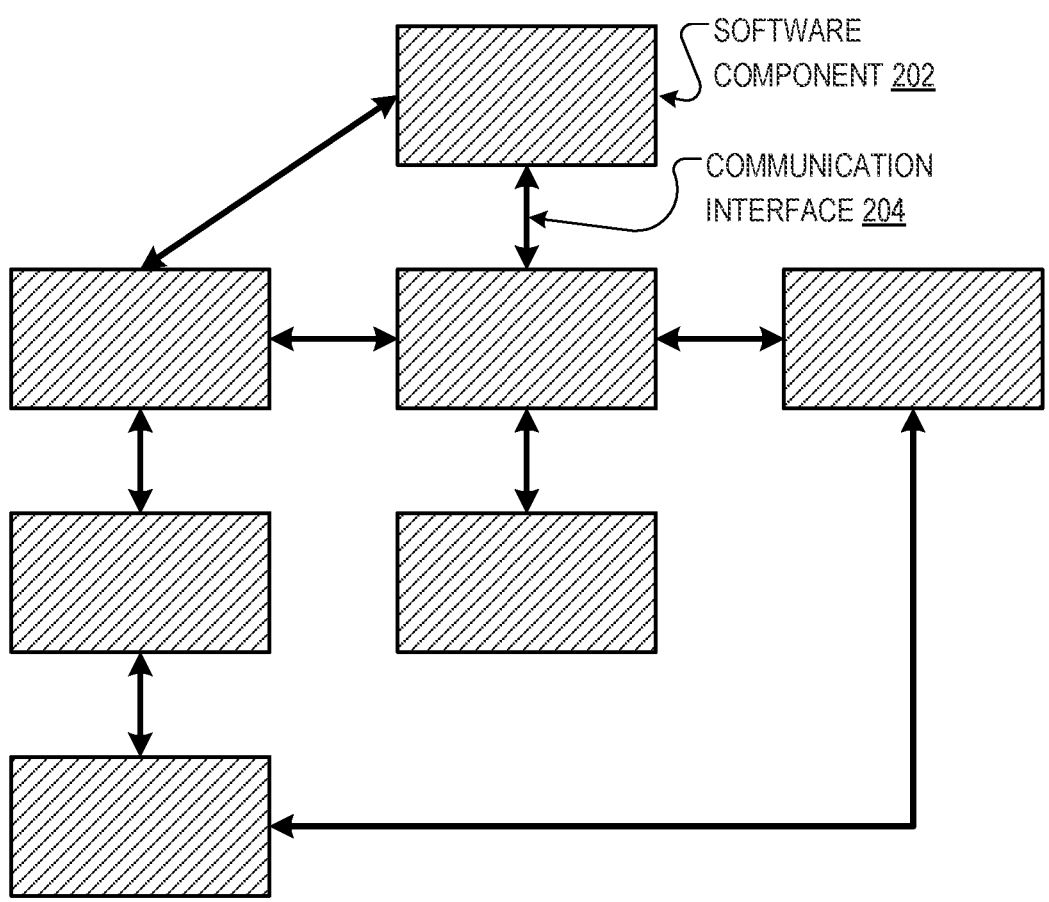
FIG. 2 is an illustration of an example software relationship model.

FIG. 2 illustrates an example of a software relationship model 200. The software relationship model identifies: (i) a set of software components, represented visually in FIG. 2 as hatched boxes 202, and (ii) communication interfaces between software components in the set of software components, represented visually in FIG. 2 as arrows 204. The software relationship model can also define a respective communication protocol implemented by each of the communication interfaces 204.

In one example, the software relationship model 200 of FIG. 2 can represent a software system of a vehicle. In this example, software components of the software relationship model can represent one or more of: software of a selfdriving system of the vehicle, software of a steering system of the vehicle, software of a braking system of the vehicle, software of an onboard entertainment system of the vehicle, software of a climate control system of the vehicle, etc. The communication interfaces of the software relationship model can implement communication protocols such as, e.g., a controller area network (CAN) bus protocol, a FlexRay protocol, an inter-process communication (IPC) protocol, or an on-board diagnostic (OBD) communication protocol. The software security analyzer described herein can be used, e.g., to generate a risk assessment for binary software code of a vehicle software system using a software relationship model, as will be described in more detail with reference to FIG. 3.

Figure 3:
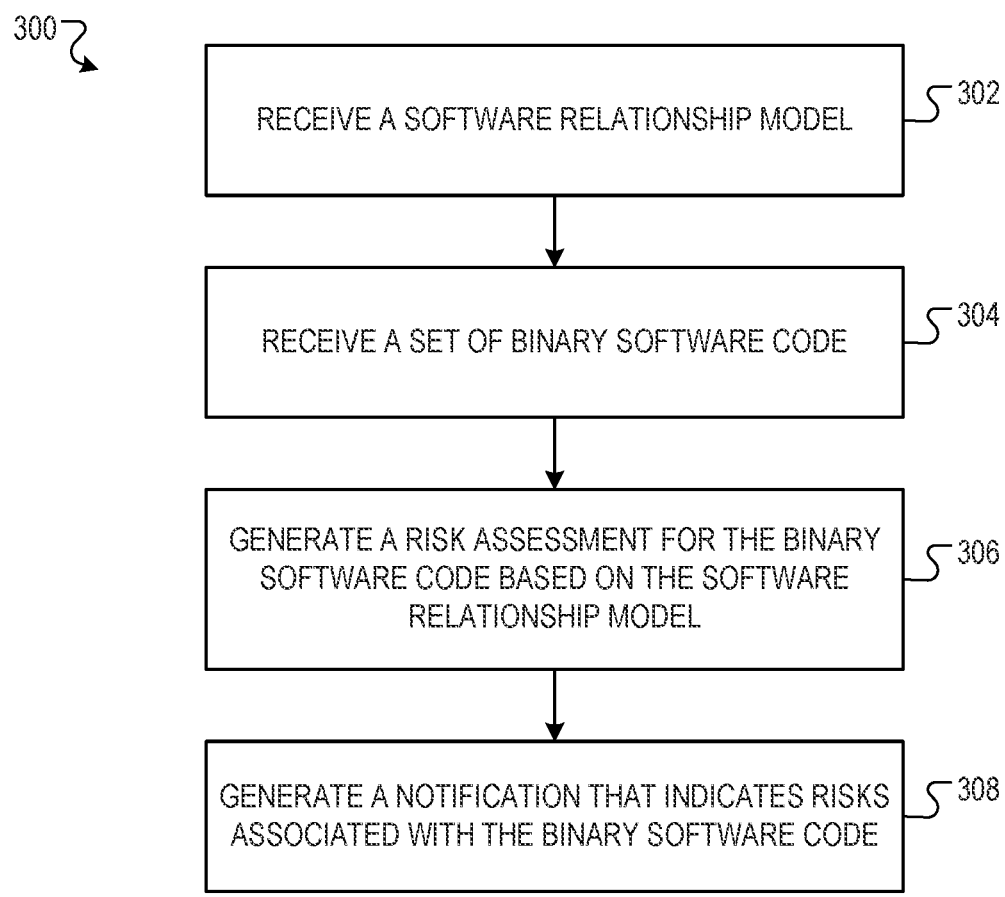
FIG. 3 is a flowchart showing an example process for determining security risks of binary software code using a software relationship model.

FIG. 3 is a flow diagram of an example process 300 for generating a risk assessment for a set of binary software code based on a software relationship model. A software security analyzer, e.g., the software security analyzer 116 of FIG. 1, appropriately programmed in accordance with this specification, can perform the process 300. The example process 300 shown in FIG. 3 can be implemented using additional, fewer, or different operations, which can be performed in the order shown or in a different order.

The process 300 starts at step 302 with the software security analyzer receiving a software relationship model that defines an architecture of a software system. The software relationship model identifies: (i) a set of software components of the software system, and (ii) communication interfaces between software components in the set of software components. Optionally, the software relationship model can further identify, for each communication interface, a respective communication protocol implemented by the communication interface. In some implementations, the software relationship model includes a respective unique tag (e.g., represented as an alphanumeric sequence) corresponding to each software component in the set of software components, i.e., such that each software component is uniquely identified by its corresponding tag.

The software security analyzer can receive the software relationship model from a software developer (e.g., by way of a software developer device 104) over a network (e.g., the network 106). The software relationship model may have been generated by any appropriate manual or automated process. For example, the software relationship model may be generated by one or more users of the software developer device, e.g., as part of a software development workflow.

At step 304, the software security analyzer receives a set of binary software code, which may be referred to herein for convenience as "target" binary software code. Binary software code is computer software in a binary format. In one example, the software security analyzer receives the target binary software code from a software developer (e.g., by way of a software developer device 104) over a network (e.g., the network 106). The target binary software code can represent application software, system software (e.g., an operating system or a device driver), or a component thereof. In some cases, the software security analyzer receives the target binary software code without receiving corresponding source code of the software.

Along with the target binary software code, the system can receive a tag (e.g., represented as an alphanumeric sequence) that identifies the software component corresponding to the target binary software code. A set of binary software code can be said to "correspond" to a software component if the binary software code implements the software component, i.e., such that the binary software code, when executed, performs the operations of the software component.

At step 306, the software security analyzer generates a risk assessment for the target binary software code based on the software relationship model. The risk assessment for the target binary software code identifies one or more security risks of the set of binary software code.

To generate the risk assessment, the software security analyzer can identify a software component, i.e., from the set of software components included in the software relationship model, that corresponds to the target binary software code. (For convenience, the software component corresponding to the target binary software code may be referred to herein as the "target" software component). For example, the software security analyzer can identify the target software component corresponding to the set of binary software code by matching a tag included in the target binary software code to the tag of the target software component.

After identifying the target software component, the software security analyzer can determine, from the software relationship model, one or more communication interfaces associated with the target software component. A communication interface in the software relationship model is said to be "associated" with a software component if the software component communicates with one or more other software components by way of the communication interface. The software security analyzer can then determine the risk assessment for the target binary software code based on the communication interfaces associated with the target software component.

A few example techniques by which the software security analyzer can determine the risk assessment for the target binary software code are described next.

In some implementations, to determine the risk assessment for the target binary software code, the software security analyzer can access a communication protocol risk database, e.g., the communication protocol risk database 120. The communication protocol risk database 120 stores data that defines, for each communication protocol in a set of communication protocols, a set of one or more possible security risks corresponding to the communication protocol. The software security analyzer can access the communication protocol risk database to identify, for each communication protocol implemented by a communication interface associated the target software component, the set of possible security risks corresponding to the communication protocol.

After determining the possible security risks corresponding to the communication protocols implemented by the communication interfaces associated with the target software component, the software security analyzer can generate the risk assessment for the target binary software code based at least in part on the possible security risks. For example, the software security analyzer can scan the target binary software code to evaluate each of the possible security risks. Generally, scanning a set of binary software code to evaluate a possible security risk can refer to processing the set of binary software code to determine whether one or more predefined security risk criteria, which are specific to the possible security risk, are satisfied. In response to determining, as a result of scanning the target binary software code, that the security risk criteria for the possible security risk are satisfied, the software security analyzer can designate the possible security risk for inclusion in the risk assessment.

A few examples of possible security risks of communication protocols are described next.

In one example, a communication protocol can have a memory corruption security risk, e.g., based on improper (e.g., malicious) modification of the contents of memory locations resulting at least in part from use of the communication protocol. The software security analyzer can scan a set of binary software code to evaluate a memory corruption security risk, e.g., by processing the code to determine whether the code uses an insecure application programming interface (API) or implements insecure buffer management operations.

In another example, a communication protocol can have a packet tampering security risk, e.g., based on packets (i.e., blocks of data) being improperly (e.g., maliciously) modified, e.g., while the packets are in transit between software components by way of a communication interface. The software security analyzer can scan a set of binary software code to evaluate a packet tampering security risk, e.g., by processing the code to determine whether the code operates on data packets subject to the packet tampering security risk, e.g., exposing the code to possible logic issues and insecure behavior.

In another example, a communication protocol can have an information disclosure security risk, e.g., based on data transmitted in accordance with the communication protocol possibly exposing sensitive (protected) information. The software security analyzer can scan a set of binary software code to evaluate an information disclosure security risk, e.g., by processing the code to determine whether the code implements error handling logic that, when operating on data transmitted in accordance with the communication protocol, may result in exposure of sensitive information.

In another example, a communication protocol can have a denial of service security risk, e.g., based on data transmitted in accordance with the communication protocol possibly causing certain services or operations associated with a software component to become unavailable, e.g., until a reboot occurs. The software security analyzer can scan a set of binary software code to evaluate a denial of service security risk, e.g., by processing the code to determine whether the code implements defenses that cause the code to be robust to denial of service issues.

In some implementations, to determine the risk assessment for the target binary software code, the software security analyzer can access a code feature database, e.g., the code feature database 122.

The code feature database 122 stores data that defines, for each communication protocol in a set of communication protocols, a distribution of values of a corresponding "code feature" across multiple "historical" sets of binary software code that are each associated with a communication interface that implements the communication protocol. The value of a code feature for binary software code can define, e.g., the number of times that a particular software instruction call (e.g., related to the communication protocol) is included in the binary software code. A "historical" set of binary software code can refer to any existing set of binary software code that is associated with a communication interface that implements the communication protocol and that is stored in a database. For example, historical sets of binary software code may include previous versions of binary software code for software components in the software system. Each historical set of binary software code has a corresponding value of the code feature, and the distribution of values of the code feature can be defined by, e.g., the mean and the standard deviation of the value of the code feature across the multiple historical sets of binary software code.

The software security analyzer can, for each communication protocol implemented by a communication interface associated with the target software component, access the code feature database 122 to identify a distribution of values of a corresponding code feature. The software security analyzer can also scan the target binary software code to determine the value of code feature for the target binary software code. The software security analyzer can then evaluate the existence of a possible security risk by measuring a deviation of the value of the code feature for the target binary software code from the distribution of values of the code feature. Generally, large deviations in the expected value of a code feature for the target binary software code, when compared with historical binary software code associated with the same communication protocol, can suggest that a security risk exists, e.g., a security risk resulting from code quality or craftsmanship issues. For example, the software security analyzer can determine that a security risk exists if the value of the code feature for the target binary software code deviates from the mean of the distribution of values of the code feature by at least one standard deviation.

After identifying security risks of the target binary software code using the code feature database 122, as described above, the software security analyzer can generate the risk assessment for the target binary software code based at least in part on the identified security risks. For example, the software security analyzer can generate a risk assessment that includes each of the identified security risks.

In some implementations, to determine the risk assessment for the target binary software code, the software security analyzer can access a software component risk database, e.g., the software component risk database 124. The software component risk database 124 stores data that defines, for each of one or more software components of the software relationship model, a set of one or more security risks that have been previously identified (e.g., by the software security analyzer) for binary software code implementing the software component. Certain software components in the software relationship model may not have any associated security risks, e.g., because binary code implementing the software component has not yet been provided to the software security analyzer.

The software security analyzer can access the software component risk database to determine security risks that have been identified for "neighboring" software components, i.e., that share a communication interface with the target software component. The software security analyzer can then identify security risks of the target binary software code based on security risks corresponding to neighboring software components. For example, the software security analyzer can identify a possible security risk for the target binary software code based on: (i) a security risk for a neighboring software component, and (ii) the communication protocol implemented by the communication interface between the neighboring software component and the target software component. For example, the software security analyzer can map: (i) the security risk for the neighboring software component, and (ii) the communication protocol implemented by the communication interface, onto a possible security risk for the current software component in accordance with a manually defined or machine learned rule.

For example, the software security analyzer can map: (i) a denial of service security risk for a neighboring software component, and (ii) a communication protocol associated with a packet tampering security risk, onto a memory corruption security risk for the target software component.

In this example, the neighboring software component may be configured to provide certain data to the target software component, e.g., by writing the data to a buffer of the target software component. However, the neighboring software component can be associated with a denial of service security risk, e.g., such that the neighboring software component may, if the denial of service security risk is exploited, be unable to properly perform the function of writing appropriate data to the buffer of the target software component. The communication protocol of the communication interface between the neighboring software component and the target software component being associated with a packet tampering security risk may result in the inability of the neighboring software component to properly perform its functions going undetected.

Thus the combination of the denial of service security risk for the neighboring software component and the packet tampering security risk of the communication protocol may result in a memory corruption security risk for the target software component, e.g., resulting from improper data possibly being written to a buffer/memory of the target software component by the neighboring software component. It can be appreciated that, in this example, the identification of the memory corruption security risk of the target software component is enabled by the software relationship model, i.e., such that the software security analyzer may be unable to identify the memory corruption security risk for the target software component in the absence of the software relationship model.

After identifying possible security risks for the current software component by "propagating" security risks from neighboring software components, as described above, the software security analyzer can evaluate the possible security risk by scanning the set of binary software code implementing the current software component. In response to determining, based on the results of the scan, that a security risk exists for the set of binary software code, the software security analyzer can include the identified security risk in the risk assessment.

At step 308, the security analyzer system generates a notification, based on the risk assessment for the target binary software code, that indicates security risks of the target binary software code. In some cases, the security notification can be output at the software service platform, e.g., displayed on a graphical user interface on the software service platform. This approach enables an enterprise that operates the software service platform to be informed of security risks of the software submitted to the platform. In some cases, the enterprise that operates the software service platform can enforce policies regarding the software security of code on the platform. For example, the software service platform can include, or be coupled with, an application (app) store for a device to download the software code, or a software as a service (SaaS) server that provides software service using the software code. If the security notification indicates that the target binary software code is unsafe, the software service platform can prevent the set of binary software code from being available to devices for use or download.

Alternatively or additionally, the security notification can be transmitted to the software developer device that submits the target binary software code. This approach enables the software developer to make modifications accordingly, e.g., to mitigate the security risks of the software.

Figure 4:
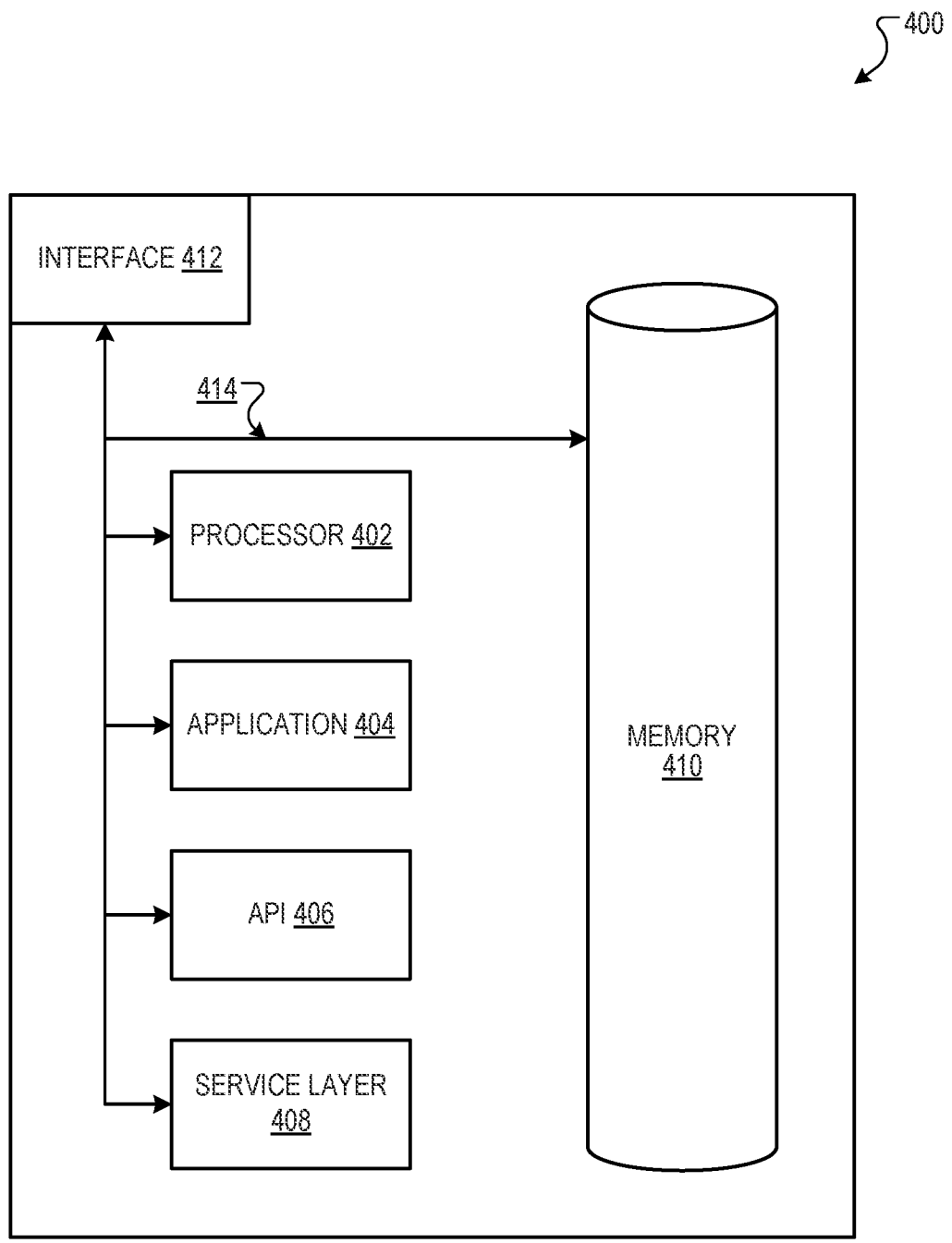
FIG. 4 is a block diagram of an example architecture of a computer.

FIG. 4 illustrates a high level architecture block diagram of a computer 400 according to an implementation. The computer 400 can be implemented as one of the software developer device 104, the client device, the server 108, or the software service platform 110 of FIG. 1. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The computer 400 includes a computing system configured to establish a secured code package for a browser plugin and generate a message communication when executing the plugin in the browser. In some cases, the computer 400 may include a computing system implementing processes and methods disclosed in FIGS. X to X. In some cases, the processing algorithm of the code package establishment can be implemented in an executable computing code, e.g., C/C++ executable codes. In some cases, the computer 400 can include a standalone Linux system that runs batch applications. In some cases, the computer 400 can include mobile or personal computers.

The computer 400 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The computer 400 can serve as a client, network component, a server, a database or other persistency, and/or any other components. In some implementations, one or more components of the computer 400 may be configured to operate within a cloud-computing-based environment.

At a high level, the computer 400 is an electronic computing device operable to receive, transmit, process, store, or manage data. According to some implementations, the computer 400 can also include or be communicably coupled with an application server, e-mail server, web server, caching server, streaming data server, business intelligence (BI) server, and/or other server.

The computer 400 can collect data of network events or mobile application usage events over network from a web browser or a client application, e.g., an installed plugin. In addition, data can be collected by the computer 400 from internal users (e.g., from a command console or by another appropriate access method), external or third parties, other automated applications, as well as any other appropriate entities, individuals, systems, or computers.

Each of the components of the computer 400 can communicate using a system bus 414. In some implementations, any and/or all the components of the computer 400, both hardware and/or software, may interface with each other and/or the interface 412 over the system bus 414 using an application programming interface (API) 406 and/or a service layer 408. The API 406 may include specifications for routines, data structures, and object classes. The API 406 may be either computer language-independent or -dependent and refer to a complete interface, a single function, or even a set of APIs. The service layer 408 provides software services to the computer 400. The functionality of the computer 400 may be accessible for all service consumers using this service layer. Software services, such as those provided by the service layer 408, provide reusable, defined business functionalities through a defined interface. For example, the interface may be software written in JAVA, C++, or other suitable languages providing data in Extensible Markup Language (XML) format or other suitable format. While illustrated as an integrated component of the computers 400, alternative implementations may illustrate the API 406 and/or the service layer 408 as stand-alone components in relation to other components of the computer 400. Moreover, any or all parts of the API 406 and/or the service layer 408 may be implemented as child or sub-modules of another software module, enterprise application, or hardware module without departing from the scope of this disclosure.

The computer 400 includes an interface 412. Although illustrated as a single interface 412 in FIG. 4, two or more interfaces 412 may be used according to particular needs, desires, or particular implementations of the computer 400. The interface 412 is used by the computer 400 for communicating with other systems in a distributed environment connected to a network (whether illustrated or not). Generally, the interface 412 comprises logic encoded in software and/or hardware in a suitable combination and operable to communicate with the network. More specifically, the interface 412 may comprise software supporting one or more communication protocols associated with communications such that the network or interface's hardware is operable to communicate physical signals within and outside of the computer 400.

The computer 400 includes at least one processor 402. Although illustrated as a single processor 402 in FIG. 4, two or more processors may be used according to particular needs, desires, or particular implementations of the computer. Generally, the processor 402 executes instructions and manipulates data to perform the operations of the computer 400.

The computer 400 also includes a memory 410 that holds data for the computer 400. Although illustrated as a single memory 410 in FIG. 4, two or more memories may be used according to particular needs, desires, or particular implementations of the computer 400. While memory 410 is illustrated as an integral component of the computer 400, in alternative implementations, memory 410 can be external to the computer 400.

The application 404 is an algorithmic software engine providing functionality according to particular needs, desires, or particular implementations of the computer 400. Although illustrated as a single application 404, the application 404 may be implemented as multiple applications 404 on the computer 400. In addition, although illustrated as integral to the computer 400, in alternative implementations, the application 404 can be external to the computer 400.

There may be any number of computers 400 associated with, or external to, and communicating over a network. Further, this disclosure contemplates that many users may use one computer 400, or that one user may use multiple computers 400.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

The invention claimed is:

1. A computer-implemented method comprising:
   receiving a software relationship model that identifies: (i) a set of software components, and (ii) communication interfaces between software components in the set of software components;
   receiving a set of binary software code;
   generating a risk assessment for the set of binary software code based on the software relationship model, wherein generating the risk assessment for the set of binary software code based on the software relationship model comprises:
      identifying a software component that corresponds to the set of binary software code, wherein the software component is identified by mapping the set of binary software code to the software component whose operations are performed by the set of binary software code;
      determining, from the software relationship model, one or more communication interfaces associated with the identified software component; and
      determining a risk assessment for the set of binary software code based on the communication interfaces associated with the identified software component, wherein each of the communication interfaces is associated with a communication protocol, and determining the risk assessment for the set of binary software code based on the communication interfaces comprises:
         identifying, by the software relationship model, a communication protocol implemented by the communication interface;
         identifying a set of types of possible security risks corresponding to the identified communication protocol;
         scanning the set of binary software code to evaluate each type of possible security risk in the set of types of possible security risks corresponding to the identified communication protocol; and
         determining the risk assessment for the set of binary software code based at least in part on the evaluation of the set of types of possible security risks; and
   generating a notification, based on the risk assessment for the set of binary software code, that indicates security risks associated with the set of binary software code.

2. The method of claim 1, wherein determining the risk assessment for the set of binary software code based on the communication interfaces associated with the identified software component comprises:
   determining a value of a feature of the set of binary software code; and
   determining the risk assessment for the set of binary software code based at least in part on the value of the feature of the set of binary software code and a distribution of values of the feature for binary software code associated with a communication interface implementing a same communication protocol as a communication interface associated with the identified software component.

3. The method of claim 2, wherein the value of the feature of the set of binary software code characterizes a number of times that a particular software instruction is included in the set of binary software code.

4. The method of claim 1, wherein determining the risk assessment for the set of binary software code based on the communication interfaces associated with the identified software component comprises:
   identifying a security risk for binary software code corresponding to a different software component that communicates with the identified software component by way of a communication interface; and
   determining the risk assessment for the binary software code corresponding to the identified software component based at least in part of the security risk identified for the binary software code corresponding to the different software component.

5. The method of claim 4, wherein determining the risk assessment for the binary software code corresponding to the identified software component based at least in part on the security risk identified for the binary software code corresponding to the different software component comprises:
   determining a possible security risk for the binary software code corresponding to the identified software component based on the security risk identified for the binary software code corresponding to the different software component and a communication protocol implemented by the communication interface between the identified software component and the different software component.

6. A system comprising:
   one or more computers; and
   one or more storage devices communicatively coupled to the one or more computers, wherein the one or more storage devices store instructions that, when executed by the one or more computers, cause the one or more computers to perform operations comprising:
      receiving a software relationship model that identifies: (i) a set of software components, and (ii) communication interfaces between software components in the set of software components;
      receiving a set of binary software code;
      generating a risk assessment for the set of binary software code based on the software relationship model, wherein generating the risk assessment for the set of binary software code based on the software relationship model comprises:
  identifying a software component that corresponds to the set of binary software code, wherein the software component is identified by mapping the set of binary software code to the software component whose operations are performed by the set of binary software code;
  determining, from the software relationship model, one or more communication interfaces associated with the identified software component; and
  determining a risk assessment for the set of binary software code based on the communication interfaces associated with the identified software component, wherein each of the communication interfaces is associated with a communication protocol, and determining the risk assessment for the set of binary software code based on the communication interfaces comprises:
    identifying, by the software relationship model, a communication protocol implemented by the communication interface;
    identifying a set of types of possible security risks corresponding to the identified communication protocol;
    scanning the set of binary software code to evaluate each type of possible security risk in the set of types of possible security risks corresponding to the identified communication protocol; and
    determining the risk assessment for the set of binary software code based at least in part on the evaluation of the set of types of possible security risks; and
  generating a notification, based on the risk assessment for the set of binary software code, that indicates security risks associated with the set of binary software code.

7. The system of claim 6, wherein determining the risk assessment for the set of binary software code based on the communication interfaces associated with the identified software component comprises:
  identifying a set of possible security risks based on the communication interfaces associated with the identified software component;
  scanning the set of binary software code to evaluate the set of security risks; and
  determining the risk assessment for the set of binary software code based at least in part on the evaluation of the set of possible security risks.

8. The system of claim 7, wherein identifying a set of possible security risks based on the communication interfaces associated with the identified software component comprises, for each communication interface associated with the identified software component:
  identifying, by the software relationship model, a communication protocol implemented by the communication interface; and
  determining one or more possible security risks corresponding to the communication protocol.

9. The system of claim 6, wherein determining the risk assessment for the set of binary software code based on the communication interfaces associated with the identified software component comprises:
  determining a value of a feature of the set of binary software code; and
  determining the risk assessment for the set of binary software code based at least in part on the value of the feature of the set of binary software code and a distribution of values of the feature for binary software code associated with a communication interface implementing a same communication protocol as a communication interface associated with the identified software component.

10. The system of claim 9, wherein the value of the feature of the set of binary software code characterizes a number of times that a particular software instruction is included in the set of binary software code.

11. The system of claim 6, wherein determining the risk assessment for the set of binary software code based on the communication interfaces associated with the identified software component comprises:
  identifying a security risk for binary software code corresponding to a different software component that communicates with the identified software component by way of a communication interface; and
  determining the risk assessment for the binary software code corresponding to the identified software component based at least in part of the security risk identified for the binary software code corresponding to the different software component.

12. The system of claim 11, wherein determining the risk assessment for the binary software code corresponding to the identified software component based at least in part on the security risk identified for the binary software code corresponding to the different software component comprises:
  determining a possible security risk for the binary software code corresponding to the identified software component based on the security risk identified for the binary software code corresponding to the different software component and a communication protocol implemented by the communication interface between the identified software component and the different software component.

13. One or more non-transitory computer storage media storing instructions that when executed by one or more computers cause the one or more computers to perform operations comprising:
  receiving a software relationship model that identifies: (i) a set of software components, and (ii) communication interfaces between software components in the set of software components;
  receiving a set of binary software code;
  generating a risk assessment for the set of binary software code based on the software relationship model, wherein generating the risk assessment for the set of binary software code based on the software relationship model comprises:
    identifying a software component that corresponds to the set of binary software code, wherein the software component is identified by mapping the set of binary software code to the software component whose operations are performed by the set of binary software code;
    determining, from the software relationship model, one or more communication interfaces associated with the identified software component; and
    determining a risk assessment for the set of binary software code based on the communication interfaces associated with the identified software component, wherein each of the communication interfaces is associated with a communication protocol, and determining the risk assessment for the set of binary software code based on the communication interfaces comprises:
    identifying, by the software relationship model, a communication protocol implemented by the communication interface;
    identifying a set of types of possible security risks corresponding to the identified communication protocol;
    scanning the set of binary software code to evaluate each type of possible security risk in the set of types of possible security risks corresponding to the identified communication protocol; and
    determining the risk assessment for the set of binary software code based at least in part on the evaluation of the set of types of possible security risks; and
generating a notification, based on the risk assessment for the set of binary software code, that indicates security risks associated with the set of binary software code.

14. The non-transitory computer storage media of claim 13, wherein determining the risk assessment for the set of binary software code based on the communication interfaces associated with the identified software component comprises:
    identifying a set of possible security risks based on the communication interfaces associated with the identified software component;
    scanning the set of binary software code to evaluate the set of security risks; and
    determining the risk assessment for the set of binary software code based at least in part on the evaluation of the set of possible security risks.

15. The non-transitory computer storage media of claim 14, wherein identifying a set of possible security risks based on the communication interfaces associated with the identified software component comprises, for each communication interface associated with the identified software component:
    identifying, by the software relationship model, a communication protocol implemented by the communication interface; and
    determining one or more possible security risks corresponding to the communication protocol.

* * * * *